(12) United States Patent
Willey et al.

(10) Patent No.: US 8,726,947 B2
(45) Date of Patent: May 20, 2014

(54) FUEL FILL ADAPTOR

(75) Inventors: John D. Willey, Lake Worth, FL (US);
Harry Lichter, Palm Beach Gardens, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1087 days.

(21) Appl. No.: 12/730,073

(22) Filed: Mar. 23, 2010

(65) Prior Publication Data

US 2010/0236657 A1   Sep. 23, 2010

Related U.S. Application Data

(60) Provisional application No. 61/162,492, filed on Mar. 23, 2009.

(51) Int. Cl.
| B65B 31/00 | (2006.01) |
| B60K 15/04 | (2006.01) |
| B60K 15/035 | (2006.01) |

(52) U.S. Cl.
CPC ................................ *B60K 15/03519* (2013.01)
USPC .............. 141/59; 141/302; 141/99; 141/236; 220/86.2; 137/587; 137/597

(58) Field of Classification Search
CPC .. B60K 15/04; B60K 15/035; B60K 15/0403; B60K 15/03519
USPC ......... 141/7, 59, 99, 236, 247, 302; 220/86.1–86.3; 285/129.1, 129.2, 285/130.1, 131.1; 137/215–218, 426, 441, 137/583, 587, 597

See application file for complete search history.

(56) References Cited

U.S. PATENT DOCUMENTS

| 3,659,575 | A | * | 5/1972 | Lokka | 123/327 |
| 3,918,932 | A | | 11/1975 | Lee et al. | |
| 4,441,533 | A | | 4/1984 | Snyder et al. | |
| 4,877,146 | A | * | 10/1989 | Harris | 220/746 |
| 5,203,384 | A | * | 4/1993 | Hansen | 141/59 |
| 5,282,497 | A | * | 2/1994 | Allison | 141/59 |
| 5,570,730 | A | * | 11/1996 | Keehn et al. | 141/59 |
| 5,713,401 | A | | 2/1998 | Weeks | |
| 5,839,489 | A | | 11/1998 | Ganachaud et al. | |
| 6,089,027 | A | * | 7/2000 | Wang et al. | 62/46.1 |
| 6,244,917 | B1 | * | 6/2001 | Hartke et al. | 440/88 R |

(Continued)

*Primary Examiner* — Timothy L Maust
*Assistant Examiner* — Robert Bell, III
(74) *Attorney, Agent, or Firm* — Kaplan Breyer Schwarz & Ottesen, LLP

(57) ABSTRACT

A fuel-fill adapter for use in conjunction with a manually-controlled liquid supply nozzle for filling a fuel reservoir is disclosed. The adaptor mates with liquid supply nozzle as well as the filling port of the fuel reservoir. The fuel fill adaptor includes two main fluid pathways: an incoming pathway for liquid to fill the reservoir and an outgoing pathway for vapor venting or excess liquid draining. The fuel-fill adaptor includes a low-pressure differential vacuum-breaking valve to prevent the siphon effect that would otherwise naturally occur if liquid were to enter the gas venting hose. The vacuum-breaking valve permits air to enter the adaptor, wherein the air is then drawn down the drain hose instead of any additional liquid. The vacuum breaking valve can be connected to either the incoming liquid or vent/drain pathways.

20 Claims, 8 Drawing Sheets

(56) References Cited

U.S. PATENT DOCUMENTS

| | | |
|---|---|---|
| 6,347,639 B1 | 2/2002 | Thompson |
| 6,648,021 B2 * | 11/2003 | Zheng et al. .................. 137/884 |
| 6,691,738 B2 * | 2/2004 | Kuo et al. ..................... 137/588 |
| 2006/0272706 A1 * | 12/2006 | Chung .......................... 137/218 |
| 2006/0278271 A1 * | 12/2006 | Liu ............................... 137/218 |
| 2007/0295404 A1 * | 12/2007 | Cover ........................... 137/218 |
| 2008/0029160 A1 * | 2/2008 | Qiu et al. ...................... 137/217 |
| 2011/0100336 A1 * | 5/2011 | Genz et al. .................... 123/518 |

* cited by examiner

FUEL FILL ADAPTOR

STATEMENT OF RELATED CASES

This case claims priority of U.S. Provisional Patent Application Ser. No. 61/162,492, filed Mar. 23, 2009, which is also incorporated by reference herein.

STATEMENT REGARDING FEDERALLY-SPONSORED RESEARCH

This invention was made with Government support under N00024-02-C-6309 awarded by the Department of the Navy. The Government has certain rights in the invention.

FIELD OF THE INVENTION

The present invention relates to fuel dispensing systems for dispensing fuel in a vehicle fuel tank.

BACKGROUND OF THE INVENTION

Countless types of equipment use internal combustion engines driven by gasoline or diesel fuel. The fuel is typically held in a reservoir, such as a tank or flexible bladder.

An example of a vessel having a flexible bladder is the Navy's remote mine-hunting system (RMS). The RMS includes an unmanned, semi-submersible vehicle ("RMV") that tows a variable depth sensor and includes various Sonars to detect, localize, classify, and identify moored and bottom mines. The semi-submersible vehicle is powered by a diesel engine and, as indicated above, includes a flexible/collapsible fuel bladder for storing diesel fuel.

During the fueling process, air that is in the bladder is displaced through the fill port. Experience has shown that it is difficult to fill the bladder using a conventional automobile-type fuel nozzle. Among other difficulties, the automatic shut-off feature of such nozzles will trip prematurely. If a manual nozzle is used, diesel tends to bubble out before the bladder is full (since the fuel near the top of the bladder will be foamy).

As a consequence, an improved system for delivering fuel to a reservoir, particularly a flexible bladder-type reservoir, is needed.

SUMMARY

The present invention provides a way to completely fill a tank, such as a flexible bladder, with fuel, such as diesel, while preventing spills.

The illustrative embodiment of the present invention is a fuel-fill adapter for use in conjunction with filling a fuel reservoir, especially a flexible bladder, with fuel, especially diesel. In accordance with the illustrative embodiment, a fuel fill adaptor includes two main fluid pathways: an incoming pathway for liquid to fill the reservoir and an outgoing pathway for vapor venting or excess liquid draining.

The two main fluid pathways are oriented vertically and have staggered terminations to separate the incoming liquid from the displaced vapor. Both the incoming liquid and outgoing pathways are disposed within the fuel-fill adaptor which uses a single opening on the tank or bladder to be filled.

The adaptor mates with and seals on the same surfaces as the cap of the fuel tank. In some embodiments, the adaptor swivels on to, or otherwise connects to one or more separate hoses for liquid filling and gas or excess liquid venting and draining. In the illustrative embodiment, connection is effected by quick disconnect (QD) fittings.

In the illustrative embodiment, the adaptor is used with a manually-controlled liquid supply valve or nozzle. Automatic shutoff valves, such as those used for fueling, would shut off upon encountering a backpressure. This would require the tank or bladder to be filled very slowly or incompletely. The manually-controlled liquid supply valve therefore enables the use of high pressures and flow rates to quickly fill large containers or bladders.

The vent/drain hose is positioned with its exit termination at a lower elevation than the fuel-filling adaptor. This enables the vapor vent hose to also drain any excess liquid pumped into the container before the manual valve is closed. The outlet of the vent/drain hose is directed into a suitable container, or, in some embodiments, back into the fuel-supply reservoir.

The fuel-fill adaptor further includes a low-pressure differential vacuum-breaking relief valve to prevent the siphon effect that would otherwise naturally occur if liquid were to enter the gas venting hose. This siphon could potentially drain the entire container or bladder. The vacuum-breaking valve permits air to enter the adaptor, wherein the air is then drawn down the drain hose instead of any additional liquid. The vacuum breaking valve can be connected to either the incoming liquid or vent/drain pathways.

The vacuum-breaking valve is set to open at a low pressure differential to ensure that once the tank/container/bladder is filled completely or overfilled, the siphon will stop when the liquid level is at the base of the adaptor and at atmospheric pressure. In this fashion, when the adaptor is removed, the bladder is consistently filled to the brim.

In some embodiments, the vent/drain hose is made from a clear material so that the filling operator can readily see that the bladder is full or nearly full. Depending on the filling, liquid bubbles may be seen in the drain hose to indicate that the bladder is nearly full (before liquid is observed indicating the container or bladder is completely full). When filling an elastic bladder it is preferable to slow down or stop when bubbles are observed to minimize the amount of liquid that must be drained if the bladder is inflated due to the filling pressure being greater than atmospheric pressure.

In some embodiments, the filling adaptor has a restricted fluid crossover pathway between the incoming liquid pathway and vent/drain pathway. This crossover pathway is narrow or restricted so that a small amount of the higher pressure liquid coming through will drop into the bladder and not effect the venting gas while the container or bladder is at ambient pressure. If, however, the bladder is at elevated pressure, then some of the liquid will be blown up into the vent/drain hose to serve as an early indication to the operator that the container or bladder is being pressurized and is nearly full. If the vacuum-breaking valve is connected to the liquid filling pathway of the fuel-fill adaptor, then the crossover pathway will provide another route for the incoming air from the vacuum-breaking valve to travel to the vent/drain hose and help stop the siphon sooner.

DETAILED DESCRIPTION

Figure 1:
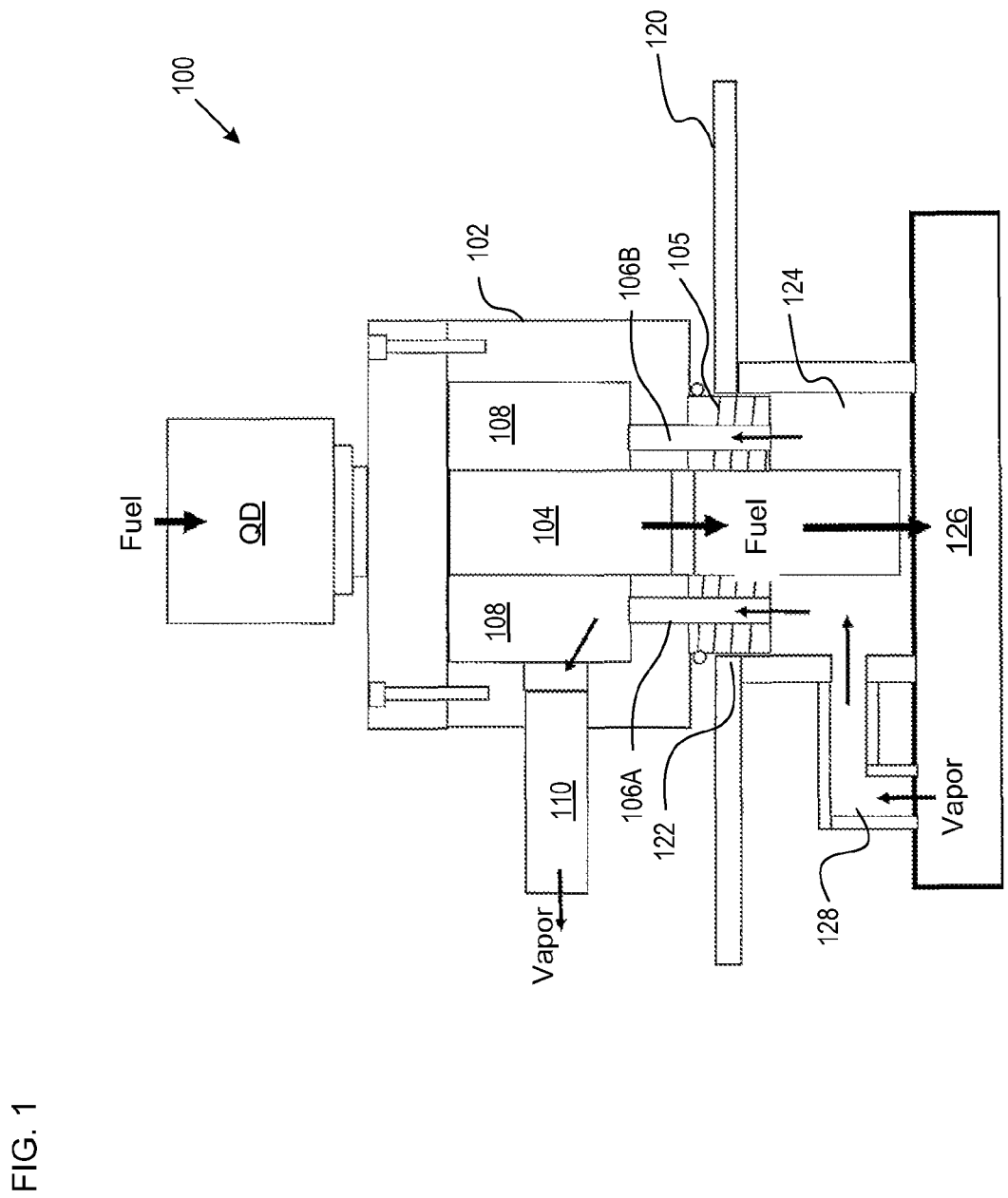
FIG. 1 depicts a fuel-fill adapter for use in a fuel-filling system.

FIG. 1 depicts prototype fuel-fill adapter 100. This adapter is designed for use with the Navy's remote mine-hunting vehicle (RMV).

Fuel-fill adapter 100 of FIG. 1 includes body 102, quick disconnect QD, fuel delivery pipe 104, cap/fitting 105, vents 106A/B, cavity 108, drain/vent tube 110. In use, the fuel-fill adapter seals to a fuel-fill nozzle (not depicted) at quick disconnect QD. Cap/fitting 105 seals fuel-fill adapter 100 to fill port 122 of fuel bladder 126 within RMV 120. When sealed to the fill port, fuel-delivery pipe 104 extends into fuel-fill elbow 124 to deliver fuel to fuel bladder 126.

Fuel-bladder vent 128 enables air to be exhausted from fuel bladder 126. Air exhausted from the fuel bladder exits fuel-fill elbow 124 through vents 106A and/or 106B in cap/fitting 105. The air enters internal cavity 108 of the fuel-fill adapter and is exhausted through drain/vent tube 110. Vents 106A and 106B also provide a path for over-flowing fuel to exit the fuel-fill elbow and empty into a waste container (not depicted).

Although the adapter of FIG. 1 represents an improvement over the prior art, it is subject to several shortcomings. In particular, the adapter of FIG. 1 is subject to a siphon effect that is created through drain/vent tube 110. Since the waste container will typically be at a lower height than fuel bladder 126, and since the fuel bladder is collapsible, the fuel bladder could empty due to gravity, if allowed. In fuel-fill adapter 100, this issue is dealt with in two ways. First, the siphon effect is prevented or limited by observing the level of fuel in bladder 126 and slowing the rate at which fuel is added to the bladder when it is nearly full and then stopping the flow of fuel as soon as foam is observed in drain hose 110. Second, the siphon can be stopped by pinching the drain hose to stop the flow and allow the portion of the hose downstream of the pinch to clear with air bubbling up from the free end of the hose. These approaches require strict attention by the person handling the filling procedure.

Another problem with the fuel-fill adapter of FIG. 1 is that it is not compatible for use on board a ship because it interferes with the existing RMV capture device (for deploying and retrieving the RMV).

Figure 2:
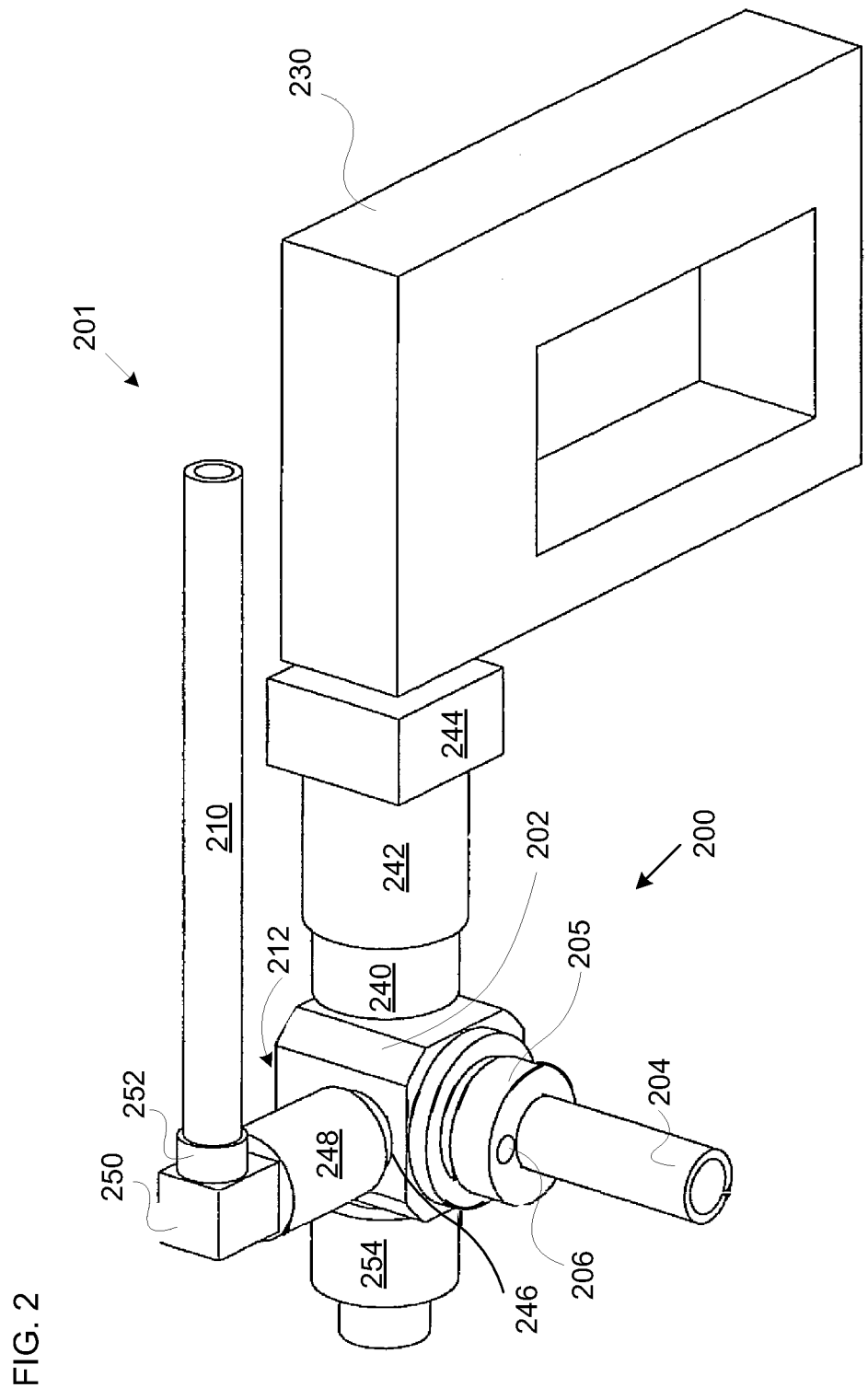
FIG. 2 depicts a perspective view of a fuel-filling system comprising a fuel-fill adapter in accordance with the illustrative embodiment of the present invention.

These shortcomings led to the development of fuel-fill adapter 200 in accordance with the illustrative embodiment of the invention, which as depicted as a part of an improved system 201 for delivering fuel to a reservoir, as shown in FIG. 2.

Figure 3:
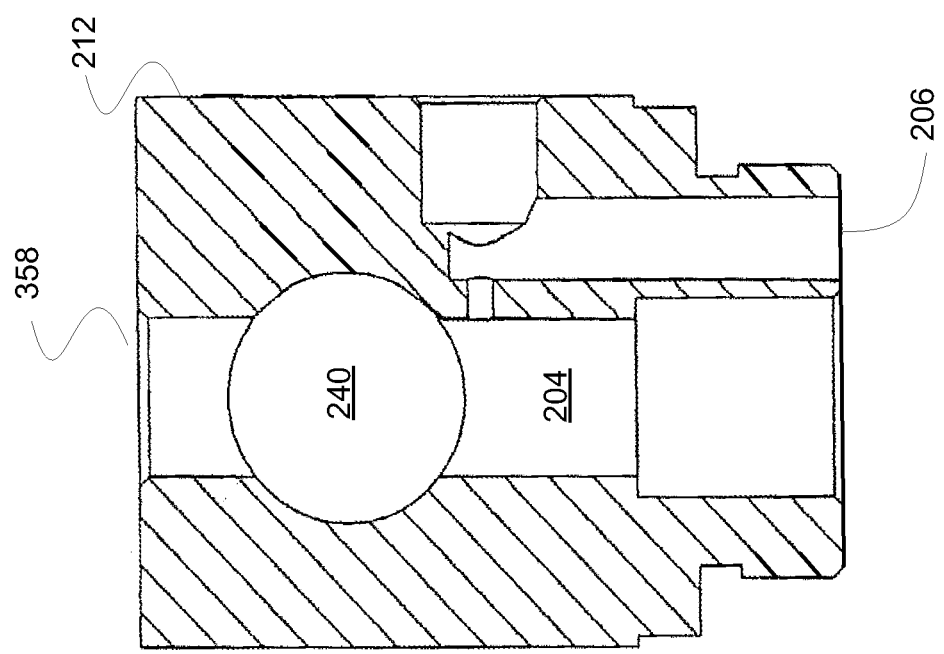
FIG. 3 depicts a cross-sectional view of the fuel-fill adapter of FIG. 2, sans handle and vent/drain hose.

FIG. 2 depicts a perspective view of fuel-filling system 201 in accordance with the illustrative embodiment of the present invention. System 201 includes fuel nozzle 230 (represented by the "handle" like structure) and fuel-fill adapter 200. The fuel-fill adapter is depicted via cross section in FIG. 3 and a top view in FIG. 4. The view of fuel-fill adapter 200 depicted in FIG. 3 is "rotated" 90 degrees "to the right" with respect to the view depicted in FIG. 2. The view of fuel-fill adapted 200 depicted in FIG. 4 is rotated ninety degrees "to the left" with respect to the view depicted in FIG. 2.

Figure 4:
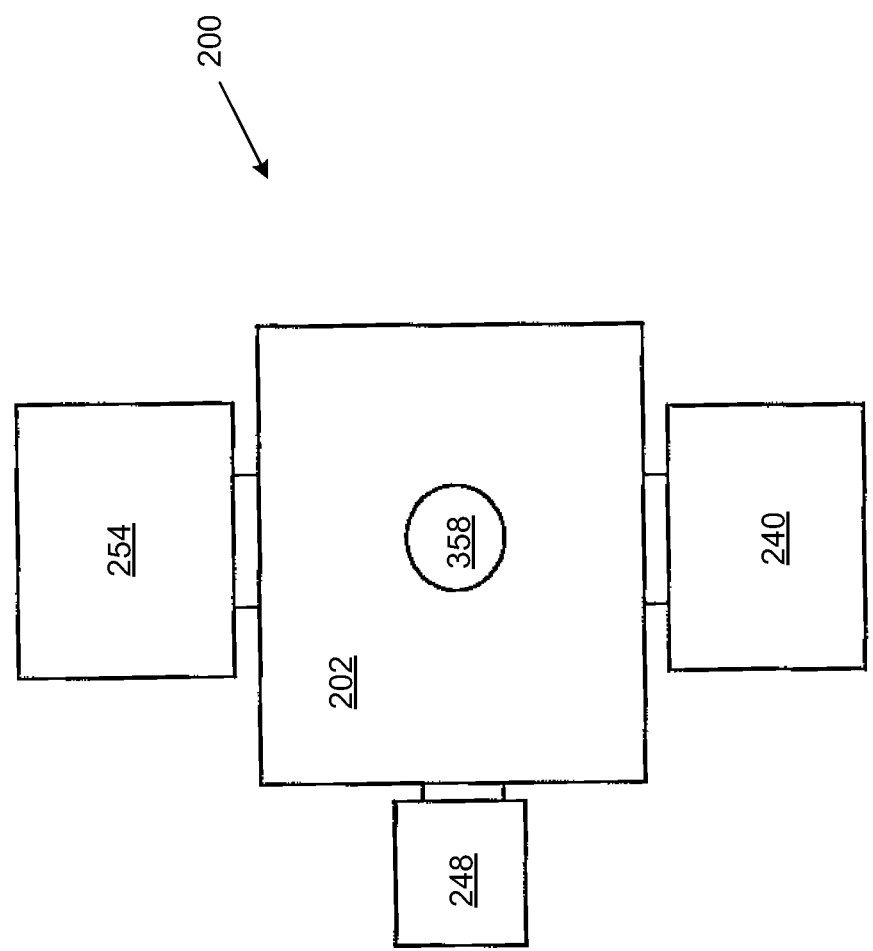
FIG. 4 depicts a plan view of the fuel-fill adapter of FIG. 3.

Referring now to FIGS. 2, 3, and 4, fuel-fill adapter comprises body 202, fuel-delivery pipe 204, cap/fitting 205, vent (inlet) 206, vent/drain tubing 210, and vacuum-breaking valve 212.

The fuel-fill adapter further comprises several "quick disconnect" fittings to quickly and easily couple and uncouple fuel-fill adapter 200 to other elements of fuel-filling system 201. In particular, fuel-fill adapter 200 includes quick disconnect plugs 240, 246, and 254. When the quick disconnect plugs are "in use" to connect something to some element of the system to fuel-fill adapter 200, they will couple to quick disconnect sockets. For example, to couple fuel nozzle 230 to the fuel-fill adapter, quick disconnect socket 242 is coupled to quick disconnect plug 240. (NPT adapter 244 is also used to couple quick disconnect socket 242 to fuel nozzle 230.) Further, to couple vent/drain tube 210 to fuel-fill adapter 200, quick disconnect socket 248 is coupled to quick disconnect plug 246. This connection also uses hose barb elbow 250 and hose clamp 252. The unused quick disconnect plug 254 is available for coupling, for example, to the fuel nozzle 230, etc., if the specifics of the fueling application require a different orientation for fuel-filling system 201 (due to the presence of equipment near the fill port).

Figure 5:
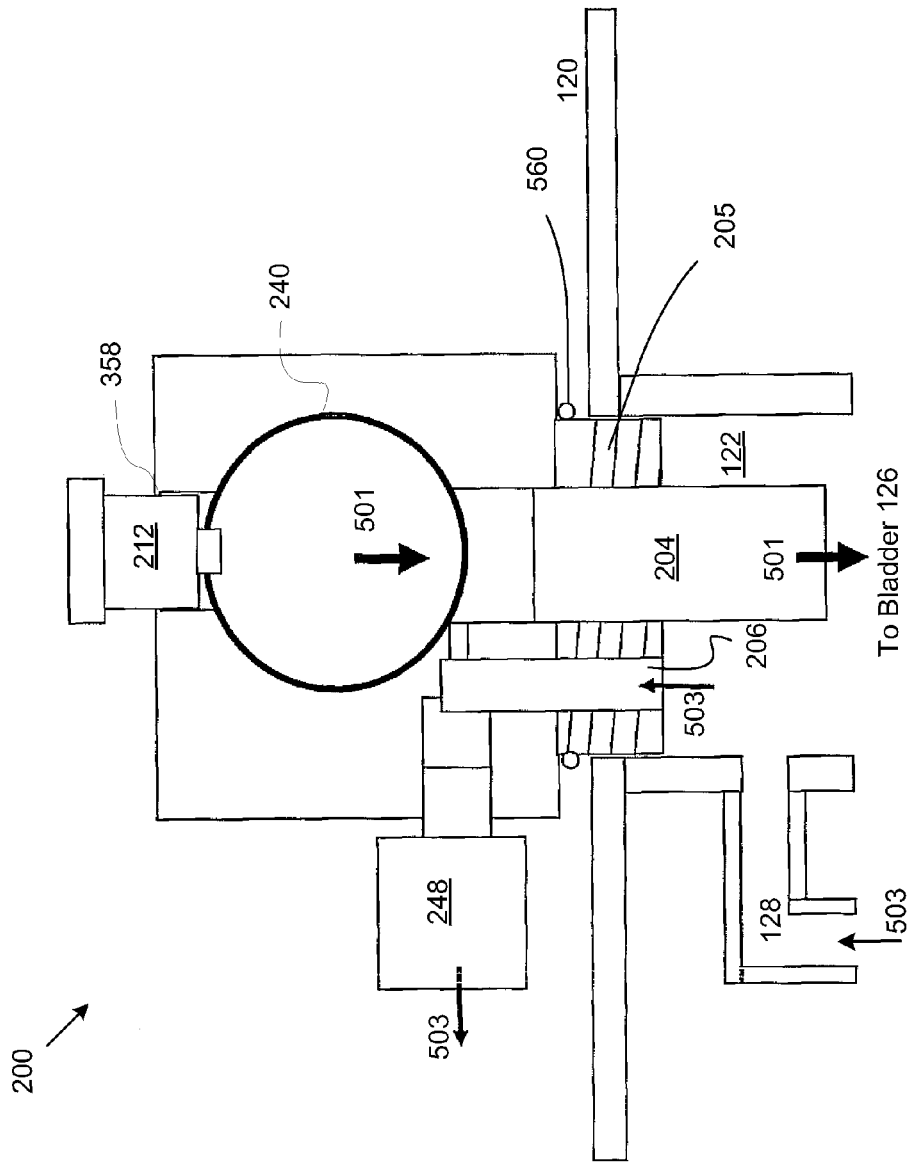
FIG. 5 depicts a cross-sectional view of a fuel-fill adapter in accordance with the illustrative embodiment, wherein the fuel-fill adapter is disposed in the filling port of a fuel tank.

Air inlet 358 (FIGS. 3 and 4) receives vacuum-breaking valve 212 (see, e.g., FIG. 5).

FIG. 5 depicts the fuel-fill adapter 200 coupled to fill port 122 of RMV 120. (Fuel nozzle 230 is not depicted for clarity.) Fuel-delivery pipe 204 extends into fuel-fill elbow 124 of the RMV to deliver fuel 501 to the RMV's fuel bladder 126. In the illustrative embodiment, cap/fitting 205 is threaded; gasket 560 prevents any leakage of fuel (vapor or liquid). The orientation of fuel-fill adapter 200 in FIG. 5 is the same as in FIG. 4. As such, fuel 501 enters through quick disconnect socket 242 (i.e., "into the page" as shown in FIG. 5).

FIG. 5 also depicts the venting of air 503 from fuel bladder 126 via fuel-bladder vent 128. The vented air enters vent inlet 206 at cap/fitting 205 and is vented from fuel-fill adapter 200 (e.g., through vent/drain tube 210, which is not depicted in FIG. 5).

Figure 6:
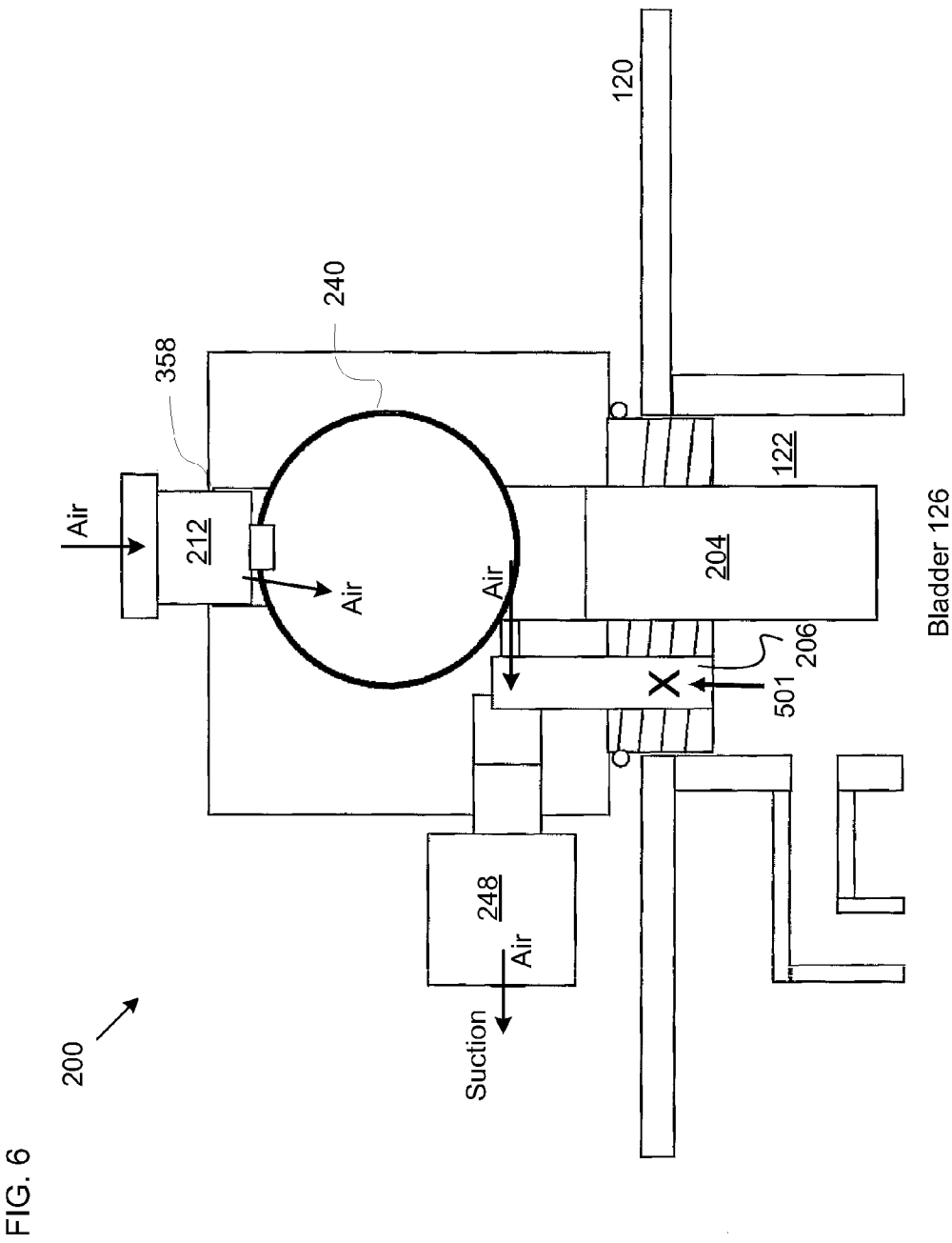
FIG. 6 depicts a cross-sectional view of the fuel-fill adapter of FIG. 4, showing the effect of the operation of the vacuum-breaker valve.

FIG. 6 depicts the operation of vacuum-breaking valve 212. The purpose of the vacuum-breaking valve, which in the illustrative embodiment is a check valve, is to prevent fuel 501 from being siphoned out of fuel bladder 126. Briefly, the vacuum-breaking valve works as follows. If a siphon is created, suction from the siphon draws air 503 through vacuum-breaking valve 212 rather than drawing fuel from bladder 126. Air 503 is drawn through vent/drain tubing 210 (not shown).

Figure 7:
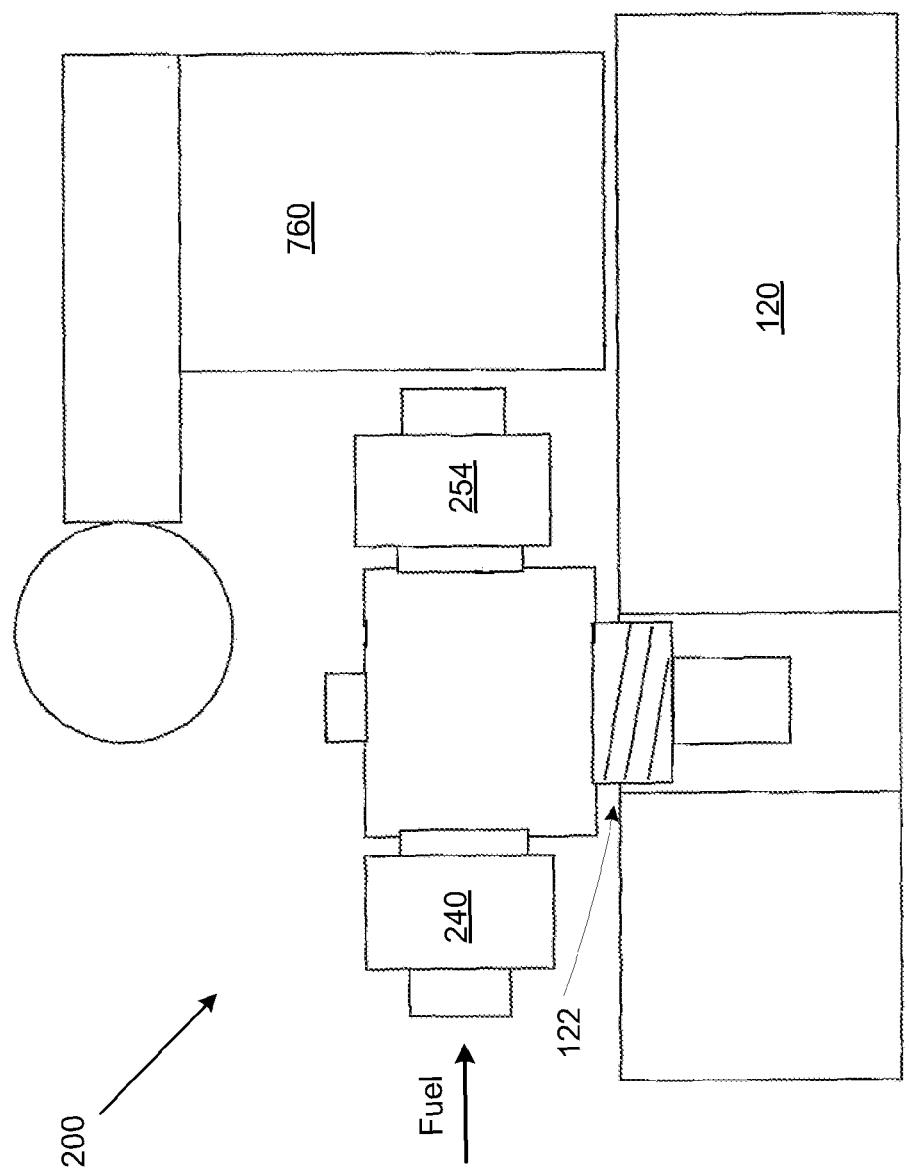
FIG. 7 depicts a fuel-fill adapter in accordance with the illustrative embodiment, wherein the fuel-fill adapter is coupled to the filling port of the fuel bladder of an RMV, and wherein the RMV is coupled to a capture device located aboard a mother ship.

FIG. 7 depicts fuel-fill adapter 200 coupled to fill port 122 of RMV 120, wherein the RMV is coupled to a capture device 760 located aboard a mother ship. The size and configuration of fuel-fill adapter 200 enables it to couple to filling port 122 while the RMV is coupled to the capture device.

Figure 8:
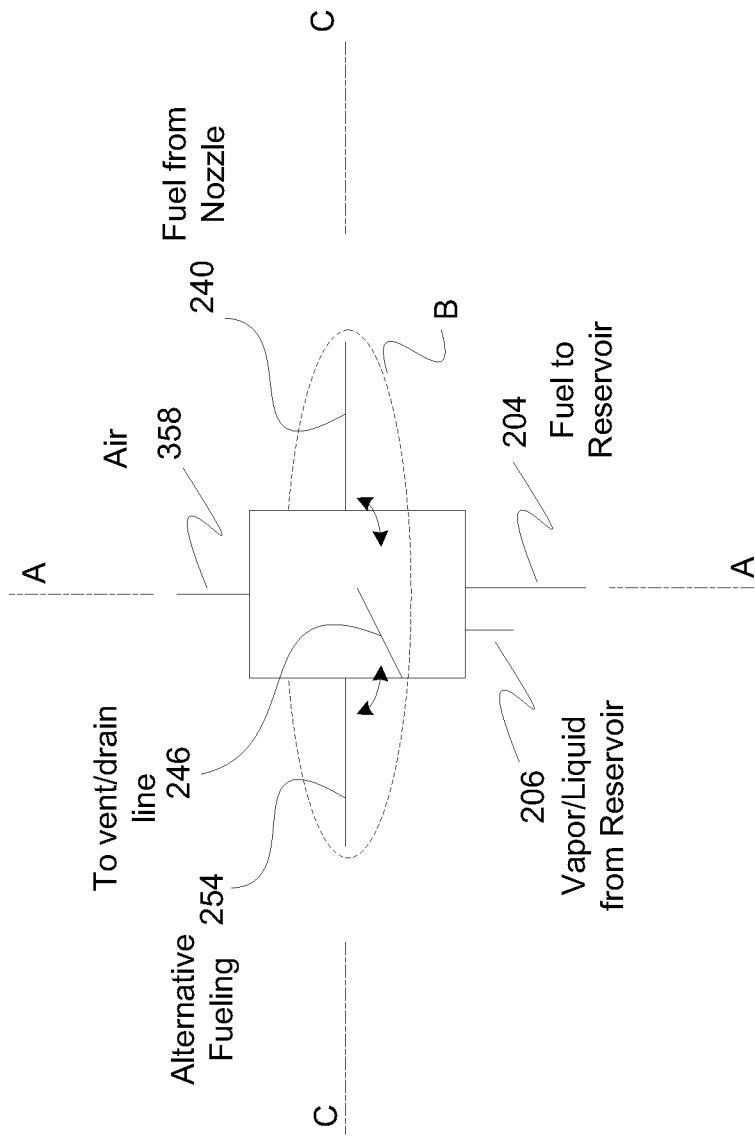
FIG. 8 depicts, via a simplified representation of a fuel-fill adapter, certain geometric relationships between the various ports/features.

FIG. 8 depicts, via a simplified representation of fuel-fill adapter 200, certain geometric relationships between the various ports/features. The orientation of the fuel-fill adapter depicted in FIG. 8 is the same as that shown in FIG. 2.

As depicted in FIG. 8, the three quick disconnect plugs 240, 246, and 254 are co-planar, falling in the plane identified "B." Each of these quick disconnect plugs is oriented ninety degrees away from its nearest neighbor. Quick disconnect plugs 240 and 254, which in the illustrative embodiment define respective primary and alternative couplings to fuel nozzle 230 are 180 degrees apart; that is, they are co-linear.

Air inlet 358, which falls along axis A-A, is orthogonal to plane B in which the quick disconnect plugs lie. Likewise, fuel delivery pipe 204, which also falls along axis A-A, is orthogonal to plane B. The conduit leading from vent 206 is parallel to fuel delivery pipe 204.

In operation, the fuel-fill adapter is used in conjunction with fuel nozzle 230 to fuel a vessel, such as an RMV, as follows:

1. Position an absorbent towel, etc., near fuel-fill cap of an RMV, etc., on any surface that is desirable to protect from exposure to dripping fuel. The towel should be positioned under any quick disconnects as they are disconnected.
2. Remove the fuel fill cap of the RMV providing access to fuel bladder 126.
3. Install fuel-fill adaptor 200 into fill port 122 of the RMV.
4. Attach quick disconnect socket 248 for vent/drain hose 210 to quick disconnect plug 246 on fuel-fill adaptor 200. Position the free end of vent/drain hose 210 into a suitable drain or empty container of at least about 10 gallons.
5. Attach fuel-fill hose/nozzle 230 to the most easily accessible quick disconnect (e.g., quick disconnect plug 254/ quick disconnect socket 456 or quick disconnect plug 242/quick disconnect socket 244) of fuel-fill adaptor 200.
6. Begin pumping fuel into bladder 126.
7. When fuel begins to enter vent/drain hose 210, relax the lever of fuel nozzle 230 to a half-way position to lessen the amount of fuel that will potentially be lost.
8. When a steady stream of fuel is observed flowing out vent/drain hose 210, release the lever of fuel nozzle 230 to stop pumping.
9. It might take about 10-60 seconds for the steady stream of fuel to be broken up by bubbles, as a function of how much extra fuel was pumped into bladder 126.
10. Decouple the fuel-fill hose/nozzle 230 from fuel-fill adapter 200; some fuel may drip out. Any such leakage will be absorbed by the towel.
11. After about one minute, a "J" shape is bent into vent/drain hose 210. Allow about ten seconds to see if fuel is accumulating in the "J" and then release the hose.
12. If fuel is observed accumulating in the J-shaped bend, permit the system to settle for about another minute and then repeat operation 11, as necessary. It may take about one to five minutes for fuel bladder 126 to reach equilibrium.
13. When fuel no longer accumulates in the bend, disconnect vent/drain hose 210. Use gravity to empty fuel from the hose into the drain or waste container.
14. Decouple fuel-fill adaptor from fill port 122.
15. Re-install the fuel-fill cap of the RMV per appropriate procedures.
16. Properly dispose of towel.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A fuel-filling system comprising a fuel-fill adapter, wherein the fuel-fill adapter couples to a manually-controlled fuel nozzle and to a filling port of a fuel reservoir thereby fluidically coupling the fuel nozzle to the fuel reservoir, wherein the fuel-fill adapter comprises:
   a fitting by which the fuel-fill adapter detachably couples directly to the filling port, wherein the fitting creates a fluid-tight seal;
   a first conduit for delivering fuel from the fuel nozzle, through the fuel-fill adaptor and into the fuel reservoir;
   a second conduit for venting vapor from the fuel reservoir and draining fuel overflow, wherein the second conduit is internal with respect to the fuel-fill adapter and passes through the fitting such that the vapor and fuel overflow passes directly from the filling port to the fuel-fill adapter; and
   a vacuum-breaking valve that receives air when the fuel filling system is under siphon conditions, and wherein the air flows direct the second conduit, and from the second conduit to the ambient environment to prevent fuel from being siphoned from the fuel reservoir into the second conduit.

2. The system of claim 1 further comprising a quick disconnect plug that is in fluidic communication with the first conduit, wherein the quick disconnect plug couples, via a quick disconnect socket, the fuel-fill adapter to the fuel nozzle.

3. The system of claim 1 further comprising a quick disconnect plug that is in fluidic communication with the second conduit, wherein the quick disconnect plug couples, via a quick disconnect socket, the fuel-fill adapter to a drain/vent line.

4. The system of claim 1 further comprising a crossover pathway that places the second conduit is in fluidic communication, within the fuel-fill adapter, with the first conduit.

5. The system of claim 1 wherein the fuel-fill adapter further comprises a body, and further wherein a first quick disconnect plug, a second quick disconnect plug, and a third quick disconnect plug depend from the body.

6. The system of claim 5 wherein the first, second, and third quick disconnect plugs are co-planar in a first plane.

7. The system of claim 6 wherein two of the three quick disconnect plugs are oriented along a first axis that is orthogonal with respect to the first conduit and the remaining quick disconnect plug is oriented along a second axis, wherein the first and second axis are orthogonal to one another but co-planar.

8. The system of claim 7 further comprising an air inlet, wherein the air inlet aligns with a third axis that is oriented orthogonally to the first plane.

9. The system of claim 5 wherein the first quick disconnect plug couples the fuel-fill adapter to a fuel fill nozzle and the second quick disconnect couples the fuel-fill adapter to a vent/drain line, and wherein the first quick disconnect and the second quick disconnect are oriented orthogonally with respect to one another.

10. The system of claim 8 wherein the vacuum breaking valve aligns with the third axis.

11. A fuel-filling system comprising a fuel-fill adapter, wherein the fuel-fill adapter couples to a manually-controlled fuel nozzle and to a filling port of a fuel reservoir thereby fluidically coupling the fuel nozzle to the fuel reservoir, wherein the fuel-fill adapter comprises:
   a body;
   a fitting by which the fuel-fill adapter detachably couples directly to the filling port, wherein the fitting creates a fluid-tight seal;
   a first conduit for delivering fuel from the fuel nozzle, through the fuel-fill adaptor and into the fuel reservoir, wherein the first conduit is in fluidic communication with a first quick disconnect plug;

a second internal conduit, wherein a first end of the second conduit terminates at an external surface of the fitting and is thereby in fluidic communication with the fuel reservoir, and wherein a second end of the second conduit couples to a second quick disconnect plug; and a vacuum-breaking valve that receives air and directs it to the second conduit, and from the second conduit to the ambient environment to prevent fuel from being siphoned from the fuel reservoir into the second conduit.

12. The system of claim 11 wherein the vacuum-breaking valve and the first conduit are axially aligned with one another and orthogonal with respect to the first quick disconnect plug and the second quick disconnect plug.

13. The system of claim 11 further comprising a third quick disconnect plug that depends from the body of the fuel-fill adapter, wherein the first quick disconnect plug, the second quick disconnect plug, and the third quick disconnect plug have a co-planar orientation with respect to one another.

14. A fuel-filling system comprising a fuel-fill adapter, wherein the fuel-fill adapter couples to a manually-controlled fuel nozzle and to a filling port of a fuel reservoir thereby fluidically coupling the fuel nozzle to the fuel reservoir, wherein the fuel-fill adapter comprises:

a body, wherein the body has six ports by which the body receives or delivers fluid, at least five of which ports are in use during a fuel-filling operation, wherein the five ports that are in use include:

a first port that receives fuel from the fuel nozzle;

a second port that delivers fuel from the body to the fuel reservoir;

a third port that delivers vapor or liquid to a drain line;

a fourth port that receives air when a suction is created on the drain line;

a fifth port that receives vapor or liquid from the fuel reservoir; and a fitting by which the fuel-fill adapter detachably couples directly to the filling port, wherein the fitting creates a fluid-tight seal; and a vacuum-breaking valve that couples to the fourth port and receives the air thereform and directs it to the third port and from the third Dort to the ambient environment, thereby preventing fuel from being siphoned from the fuel reservoir into the fifth port.

15. The system of claim 9 wherein the first, second, and third quick disconnect plugs are co-planar in a first plane, and wherein the third quick disconnect plug is co-linear with the first quick disconnect plug, and further wherein the third quick disconnect is an alternative coupling to the fuel fill nozzle and is not in use if the first disconnect plug couples to the fuel fill nozzle.

16. The system of claim 11 wherein, within the fuel fill adapter, the vacuum-breaking valve is fluidically coupled to the first conduit and wherein, within the fuel fill adapter, the first conduit is coupled to the second internal conduit.

17. The system of claim 14 wherein the first port and the third port are oriented orthogonally with respect to one another.

18. The system of claim 17 wherein the fourth port is oriented orthogonally with respect to the first port and the third port.

19. The system of claim 18 wherein a sixth port, which receives fuel from the fuel nozzle as an alternative to the first port, is:

(a) co-planar with respect to the first port and the third port;

(b) co-linear with respect to the first port, and (c) orthogonal with respect to the third port.

20. The system of claim 14 wherein the vacuum-breaking valve is disposed at a relatively higher elevation, when coupled to the filling port of the fuel reservoir, than the first port and the third port.

* * * * *